US012706732B2

(12) United States Patent
Sekhar

(10) Patent No.: US 12,706,732 B2
(45) **Date of Patent: *Aug. 11, 2026**

(54) ADVANCED ENCRYPTION STANDARD WITH FREQUENT S-box UPDATE AND FUSION FUNCTION APPLICATION

(71) Applicant: Pantherun Technologies Private Limited, Bangalore (IN)

(72) Inventor: Srinivas Lakshman Sekhar, Bangalore (IN)

(73) Assignee: Pantherun Technologies Private Limited, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 19/344,096

(22) Filed: Sep. 29, 2025

(65) Prior Publication Data

US 2026/0039451 A1 Feb. 5, 2026

Related U.S. Application Data

(63) Continuation of application No. 19/076,729, filed on Mar. 11, 2025, now Pat. No. 12,463,795.

(30) Foreign Application Priority Data

Aug. 1, 2024 (IN) ............................ 202441058404

(51) Int. Cl.

| | |
|---|---|
| ***H04L 29/06*** | (2006.01) |
| ***G06F 21/00*** | (2013.01) |
| ***H04L 9/06*** | (2006.01) |
| ***H04L 9/16*** | (2006.01) |

(52) U.S. Cl.

CPC .............. *H04L 9/0631* (2013.01); *H04L 9/16* (2013.01)

(58) Field of Classification Search

None

See application file for complete search history.

(56) References Cited

U.S. PATENT DOCUMENTS

2016/0149867 A1* 5/2016 Lohr ....................... H04L 9/006 380/256
2017/0201493 A1* 7/2017 Zuckschwerdt .... H04L 63/0428
2022/0237078 A1* 7/2022 Cadloni .............. G06F 12/1081
2023/0259638 A1* 8/2023 Yang ....................... G06F 21/72 726/26
2024/0419876 A1* 12/2024 Reagen ................. G06F 9/3836

* cited by examiner

*Primary Examiner* — Lisa C Lewis
(74) *Attorney, Agent, or Firm* — Barta Jones, PLLC

(57) ABSTRACT

A method and system for implementing Advanced Encryption Standard (AES) with frequent S-box update and fusion function application is proposed. Initially, a first fusion function input is obtained based on an XOR of an input plaintext and a first cryptographic key. Thereafter, a set of encryption rounds is executed for generating a state output. This includes applying a fusion function on a fusion function input for generating a fusion function output and performing an XOR on the fusion function output and a second cryptographic key for obtaining an encryption output. The first fusion function input is the fusion function input for a first encryption round, the encryption output is the fusion function input for a following encryption round, and the encryption output obtained after last encryption round is the state output. Finally, a final round of AES encryption is executed based on the state output to obtain a ciphertext.

19 Claims, 4 Drawing Sheets

Obtain first fusion function input based on XOR operation on input plaintext and first cryptographic key 302

Execute set of encryption rounds for generating state output 304

Apply fusion function on fusion function input for generating fusion function output, obtained first fusion function input is fusion function input for first encryption round of set of encryption rounds 304A Perform XOR operation on fusion function output and second cryptographic key to obtain encryption output, encryption output is fusion function input for following encryption round, encryption output obtained after execution of last encryption round is state output, second cryptographic key is different for each encryption round and is generated based on first cryptographic key 304B Obtain ciphertext by executing final round of Advanced Encryption Standard (AES) encryption based on state output, S-box, and third cryptographic key, third cryptographic key is generated based on first cryptographic key 306

FIG. 3

ADVANCED ENCRYPTION STANDARD WITH FREQUENT S-box UPDATE AND FUSION FUNCTION APPLICATION

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 19/076,729, filed on Mar. 11, 2025, which claims priority to an Indian Non-Provisional Patent Application No. 202441058404, filed on Aug. 1, 2024.

The above referenced Applications are hereby incorporated herein by reference in their entirety.

FIELD OF TECHNOLOGY

The present disclosure relates generally to the field of cryptography in Internet of Things (IoT) systems and network communication systems. Specifically, the present disclosure relates to a system and a method for implementing Advanced Encryption Standard (AES) with frequent S-box update and fusion function application.

BACKGROUND

Advancements in the field of Internet of Things (IoT) and communication networking have led to development and implementation of several well-designed IoT-relevant equipment, network communication equipment, sensors, services, and applications. The equipment, sensors, services, and applications may be used in diverse fields such as healthcare, smart homes, smart cities, agriculture, and so on. Furthermore, industrial IoT and networking communication systems can facilitate industries in achieving higher efficiency in production and management. Although IoT and network communication systems have innumerable advantages and applicability in a variety of fields, such systems are vulnerable to security related issues and challenges involved in resolving the security related issues. Currently, symmetric key cryptographic techniques such as Advanced Encryption Standard (AES) and asymmetric key cryptographic techniques such as RSA (Rivest-Shamir-Adleman) may function as an efficient, lightweight, and secure technology that are suitable for protecting, authenticating, and ensuring integrity of data exchanged between IoT edge devices via the IoT systems or networking devices in a communication network.

However, existing cryptography libraries and hardware modules may not be able to provide an effective strategy for enhancing security of AES and/or RSA in quantum computing environments where quantum computers are employed to initiate and execute various types of attacks (aimed at compromising integrity/authenticity of data, snooping, retrieving encryption/decryption keys, and so on). For example, certain algorithms may compromise RSA in polynomial time by use of quantum computers. The quantum computers can also affect security of AES dramatically. For example, security level of AES will be halved, that is, the security level of AES-256 can be reduced such that security level of AES-256 is same as that of AES-128. To counter threats to security caused by quantum computers, some post-quantum cryptography (PQC) algorithms have been developed. Nevertheless, disadvantages of PQC such as larger key sizes, larger ciphertext sizes, and high computation time may make integration of PQC and IoT systems/resource-constrained communication devices infeasible.

Furthermore, in quantum environments, AES may be vulnerable to side-channel attacks. The threat of side-channel attacks (such as differential attack, interpolation attacks, linear cryptanalysis, and so on) may increase manifold in IoT environments/communication networks where data is exchanged frequently between the IoT edge devices/network devices. Adversaries that execute side-channel attacks acquire a large amount of plaintext and corresponding ciphertext to extract a secret key (used for encryption and decryption). Side-channel attack may compromise data privacy during transmission and/or aggregation of data packets through an IoT network or a communication networks. This may lead to data leakage issues and loss of sensitive data. To overcome side channel attacks, AES-based security frameworks (designed for IoT systems and communication systems) dynamically change secret keys. However, changing the secret keys may not be an ideal option to secure AES in quantum environments.

Therefore, in light of the foregoing discussion, there exists a need to overcome the aforementioned drawbacks associated with ensuring effectiveness of AES in securing data exchanged in IoT systems and networking communication systems in a quantum computing environment.

SUMMARY

The present disclosure provides a system and a method for implementing Advanced Encryption Standard (AES) with frequent S-box update and fusion function application. The present disclosure seeks to provide a solution to the existing problem of ensuring AES is effective and robust to cryptographic attacks in a quantum computing environment. An aim of the present disclosure is to provide a solution that constitutes securely generating S-boxes, encrypting data blocks using secure S-boxes which are frequently updated, and using the fusion function to significantly reduce computational load and latency involved in generation of ciphertexts. The solution provides frameworks for encryption and decryption of data using AES that can be used or creation of a secure communication network or a secure Internet of Things (IoT) environment. The frameworks ensure effectiveness of AES in quantum computing environments and can be integrated with resource-constrained devices (such as user-end devices). The frameworks may include an AES library and/or an AES module that may be configured to encrypt or decrypt data based on the secure S-boxes and the fusion function. The generation of secure S-boxes and frequent updating of the S-boxes, used for encrypting plaintexts, may increase robustness of AES to side-channel attacks. This is because even if an adversary collects a large amount of plaintext and corresponding ciphertext and is able to extract a secret key involved in encryption and decryption, updates in S-box (and mix-column matrix in some scenarios), nullifies efforts of the adversary to extract the secret key. The fusion function reduces the computational load and the latency involved generating state outputs at each AES encryption round by using a fusion table which allows transforming multiplication operations into look-up operations. The reduced computational load allows usage of the frameworks in resource-constrained devices (such as switching devices or user devices).

In a first aspect, the present disclosure provides a method for implementing AES with frequent S-box update and fusion function application. The method comprises obtaining a first fusion function input based on performance of an XOR operation on an input plaintext and a first cryptographic key. The method further comprises executing a set of encryption rounds for generating a state output. An execution of each encryption round comprises applying a fusion function on a fusion function input for generating a fusion function output, wherein the obtained first fusion function input is the fusion function input for a first encryption round of the set of encryption rounds. The execution of each encryption round further comprises performing an XOR operation on the fusion function output and a second cryptographic key for obtaining an encryption output. The encryption output is the fusion function input for a following encryption round. The encryption output obtained after execution of a last encryption round is the state output. The second cryptographic key is different for each encryption round and is generated based on the first cryptographic key. The method further comprises obtaining a ciphertext by executing a final round of AES encryption based on the state output, a S-box, and a third cryptographic key. The third cryptographic key is also generated based on the first cryptographic key.

In a second aspect, the present disclosure provides a system for implementing AES with frequent S-box update and fusion function application. The system comprises a server, a first user device, a second user device, a first electronic device, and a second electronic device. The server is configured to generate a set of AES parameters. The set of AES parameters includes a set of S-boxes, a set of mix-column matrices, a first cryptographic key, a set of second cryptographic keys, a third cryptographic key, a set of inverse S-boxes, and a set of inverse mix-column matrices. The server is further configured to transmit the generated set of AES parameters to the first electronic device. The first user device is configured to transmit an input plaintext for encryption of the input plaintext and transmission of an encrypted version of the input plaintext via a communication network. The second user device is configured to receive a decrypted text. The decrypted text is obtained by decrypting the encrypted version of the input plaintext and is identical to the input plaintext. The first electronic device is configured to receive, from the server, the set of AES parameters. The first electronic device is further configured to receive, from the first user device, the input plaintext. The first electronic device is further configured to obtain a first fusion function input based on performance of an XOR operation on the input plaintext and the first cryptographic key. The first electronic device is further configured to execute a set of encryption rounds to generate a state output. The execution of each encryption round comprises application of a fusion function on a fusion function input to generate a fusion function output. The first fusion function input is the fusion function input for a first encryption round of the set of encryption rounds. The execution of each encryption round further comprises performance of an XOR operation on the fusion function output and a second cryptographic key of the set of second cryptographic keys to obtain an encryption output. The encryption output is the fusion function input for a following encryption round. The encryption output obtained after execution of a last encryption round is the state output. The second cryptographic key is different for each encryption round. The first electronic device is further configured to obtain a ciphertext by performing a final round of AES encryption based on the state output, a S-box of the set of S-boxes, and a third cryptographic key. The first electronic device is further configured to transmit the ciphertext to the second electronic device. The second electronic device is configured to receive, from the server, the set of AES parameters. The second electronic device is configured to receive, from the first electronic device, the ciphertext. The second electronic device is configured to obtain the decrypted text based on performance of an AES decryption procedure, wherein the AES decryption procedure is performed based on an inverse S-box of the set of inverse S-boxes, and an inverse mix-column matrix of the set of inverse mix-column matrices. The second electronic device is configured to transmit the decrypted text to the second user device, wherein the second user device receives the decrypted text based on the transmission.

It has to be noted that all devices, elements, library, units, and modules described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not too scaled. Wherever possible, like elements have been indicated by identical numbers.

Embodiments of the present disclosure will now be described, by way of example only, with reference to the following diagrams wherein:

FIG. 3 is a flowchart that illustrates a method for implementing AES with frequent S-box update and fusion function application, in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
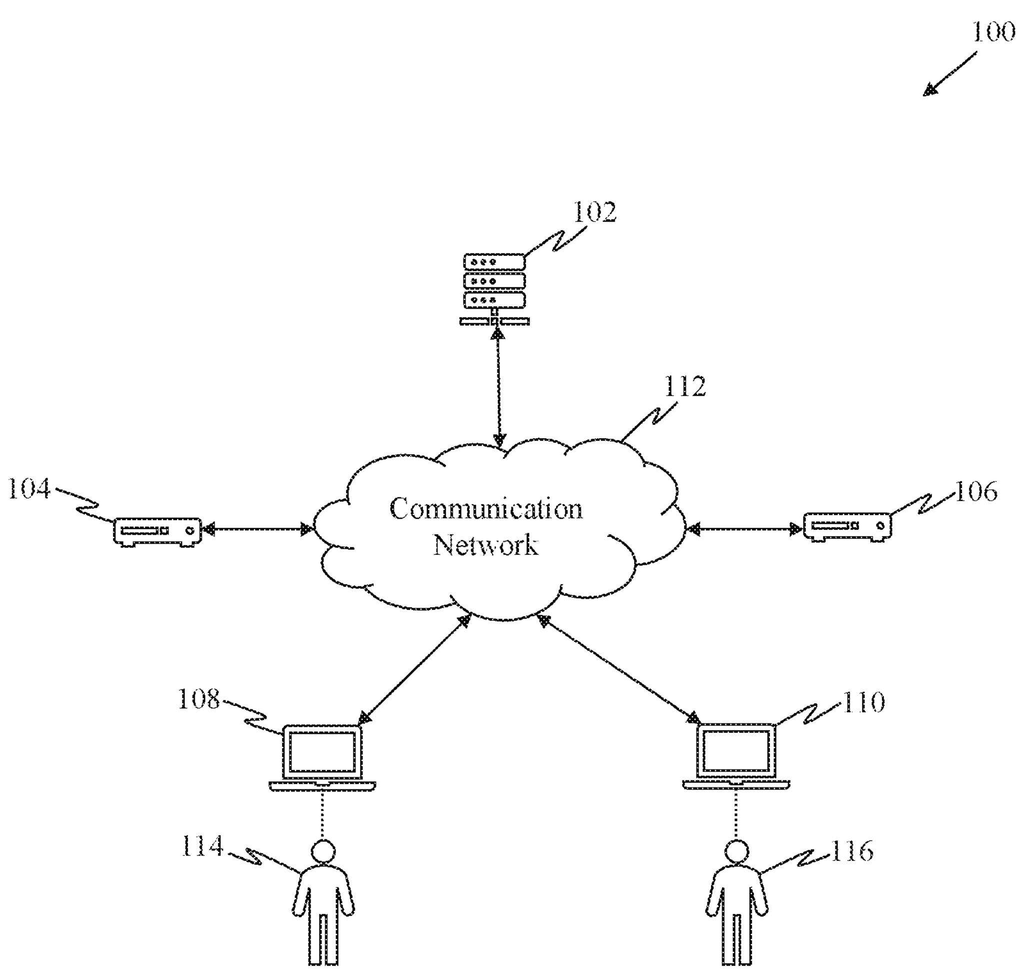
FIG. 1 illustrates an exemplary networking environment where AES can be implemented using a fusion function, in accordance with an embodiment of the present disclosure.

FIG. 1 illustrates an exemplary networking environment 100 where Advanced Encryption Standard (AES) can be implemented using a fusion function, in accordance with an embodiment of the present disclosure. With reference to FIG. 1, there is shown the networking environment 100. The networking environment 100 includes a set of entities. The set of entities include a server 102, a first user device 104, a second user device 106, a first electronic device 108, and a second electronic device 110. The server 102, the first user device 104, the second user device 106, the first electronic device 108, and the second electronic device 110 may communicate with each other via a communication network 112. The set of entities enable building an AES-based quantum secure encryption framework for different types of devices such as resource-constraint devices, networking devices, Internet of Things (IoT) devices, high-power devices, and so on. The quantum secure encryption framework is built for securing data exchanged between the first user device 104 and second user device 106.

The server 102 may be a centralized device that is configured to communicate primarily with the first electronic device 108 and the second electronic device 110 via the communication network 112. In an implementation, the server 102 may be a master server, a master machine, or a master device having significant computational processing capability. In some embodiments, the server 102 may be communicatively coupled to the first electronic device 108 and the second electronic device 110. The server 102 is configured to generate a set of AES parameters. The AES parameters of the set of AES parameters may be classified as encryption parameters or decryption parameters. Some AES parameters of the set of AES parameters may be classified as both encryption and decryption parameters. The encryption parameters include a set of S-boxes, a set of mix-column matrices, a first cryptographic key, a set of second cryptographic keys, and a third cryptographic key. The decryption parameters include the first cryptographic key, the set of second cryptographic keys, the third cryptographic key, a set of inverse S-boxes, and a set of inverse mix-column matrices. Each S-box of the set of S-boxes and each inverse S-box of the set of inverse S-boxes is a matrix. The server 102 may determine the set of inverse S-boxes by determining an inverse of each S-box of the set of S-boxes. Similarly, the server 102 may determine the set of inverse mix-column matrices by determining an inverse of each mix-column matrix of the set of mix-column matrices. The server 102 may obtain each second cryptographic key of the set of second cryptographic keys and the third cryptographic key from the first cryptographic key by using a key expansion scheme. Once the set of AES parameters is generated, the server 102 is configured to transmit the generated set of AES parameters to the first electronic device 108 and the second electronic device 110 via the communication network 112. Examples of the server 102 may include, but are not limited to, a cloud server, an application server, a data server, or an electronic data processing device.

The first user device 104 may be associated with a first user 114. The first user device 104 may be configured to generate data packets which may be required to be transmitted to the second user device 106. However, the data packets may be required to be encrypted and subsequently decoded prior to reception of the data packets by the second user device 106. Each of the data packets may include overhead bits and a payload. The payload in each data packet is required to be encrypted. At any time-instant, the first user device 104 may transmit the data packets to the first electronic device 108. The payload of each data packet is encrypted at the first electronic device 108. Examples of the first user device 104 may include, but are not limited to, a smartphone, a tablet, a laptop, a desktop, a smartwatch, a smart meter, a digital signage, a Machine Type Communication (MTC) device, and so on.

The first electronic device 108 is configured to perform encryption of user data, i.e., the data packets, received from the first user device 104. The first electronic device 108 is further configured to receive the set of AES parameters from the server 102. The first electronic device 108 may extract payloads from the data packets and obtain plaintexts. After the plaintexts are obtained, each plaintext is encrypted into a ciphertext by use of an AES library, or an AES module, included in a memory of the first electronic device 108. The first electronic device 108 includes a fusion function and a fusion table for encrypting plaintext into ciphertext. The fusion table includes elements that may be updated based on selection of a S-box from amongst the set of S-boxes and selection of a mix-column matrix from amongst the set of mix-column matrices.

The encryption of a plaintext involves obtaining a first fusion function input based on performance of an XOR operation on the input plaintext and the first cryptographic key. Thereafter, the first electronic device 108 executes a set of encryption rounds to generate a state output. The state output is obtained after completion of execution of the set of encryption rounds. The execution of each encryption round includes application of the fusion function on a fusion function input to generate a fusion function output. For the execution of the first encryption round, the fusion function may be applied on the first fusion function input (i.e., the fusion function input) to generate a first fusion function output (i.e., the fusion function output). However, for generating the fusion function output, the first electronic device 108 may execute several look-up operations using the fusion table (whose elements depends on a selected S-box of the set of S-boxes and a selected mix-column matrix of the set of mix-column matrices). The execution of each encryption round further includes performance of an XOR operation on the fusion function output and a second cryptographic key of the set of second cryptographic keys to obtain an encryption output. For the execution of the first encryption round, a first encryption output may be obtained. The encryption output is the fusion function input for a following encryption round. Thus, the first encryption output is the fusion function input for a second encryption round. The second cryptographic key is different for each encryption round. Thus, the second cryptographic key used for the performance of the XOR operation during the execution of the first encryption round is different from a second cryptographic key that will be used for the performance of the XOR operation during an execution of the second encryption round. The encryption output obtained after execution of a last encryption round is the state output.

Thereafter, a final AES operation encryption round is executed based on the state output (obtained after the completion of execution of the set of encryption rounds), a S-box of the set of S-boxes (i.e., the selected S-box), and a third cryptographic key. Upon execution of the final AES operation encryption round, a ciphertext is obtained. The execution final AES operation encryption is based on SubBytes, ShiftRows, and MixColumns functions. Thus, ciphertexts may be generated from plaintexts and data packets may be created using the ciphertexts. The ciphertexts constitute encrypted payloads of the created data packets. The first electronic device 108 is further configured to transmit the data packets including encrypted payloads (i.e., the ciphertexts) to the second electronic device 110 via the communication network 112. Additional details associated with the first electronic device 108 have been discussed in FIG. 4A. Furthermore, a process involved in encryption of an input plaintext (i.e., user data) is described in detail in FIG. 2.

The second electronic device 110 is configured to receive the data packets with encrypted payloads from the first electronic device 108 and extract ciphertexts. Each of the extracted ciphertexts may be decrypted into the original plaintext counterparts (such as the ciphertext (obtained after the execution of the final AES operation encryption round) and the input plaintext). The second electronic device 110 is further configured to receive the set of AES parameters from the server 102. For decrypting the ciphertext, the second electronic device 110 executes an AES decryption procedure by use of an AES library, or an AES module, included in a memory of the second electronic device 110. Based on the execution of the AES decryption procedure, a decrypted text is obtained. The execution is based on an inverse S-box of the set of inverse S-boxes and an inverse mix-column matrix of the set of inverse mix-column matrices. The inverse S-box is obtained by determining an inverse of the selected S-box. The inverse mix-column matrix is obtained by determining an inverse of the selected mix-column matrix. The decrypted text is identical to the input plaintext. Thus, decrypted texts may be obtained based on the execution of the AES decryption procedure and data packets data packets may be created using the decrypted texts. The decrypted texts constitute payloads of the created data packets. The second electronic device 110 is further configured to transmit the data packets including the payloads (i.e., the decrypted texts) to the second user device 106. Additional details associated with the second electronic device 110 have been discussed in FIG. 4B.

The second user device 106 may be associated with a second user 116. The second user device 106 may be configured to receive data packets from the second electronic device 110. The payloads of the received data packets constitute the decrypted texts. The received data packets are identical to those data packets that were generated by the first user device 104 and transmitted to the first electronic device 108 by the first user device 104. Examples of the second user device 106 may include, but are not limited to, a smartphone, a tablet, a laptop, a desktop, a smartwatch, a smart meter, a digital signage, a MTC device, and so on.

The communication network 112 includes a medium (such as a communication channel) through which the set of entities (i.e., the server 102, the first user device 104, the second user device 106, the first electronic device 108, and the second electronic device 110) communicate with each other through exchange of data/information. The communication network 112 may be a wired or wireless communication network. Examples of the communication network 112 may include, but are not limited to, a local area network (LAN), a wireless personal arca network (WPAN), a wireless local area network (WLAN), a wireless wide area network (WWAN), a cloud network, a long-term evolution (LTE) network, a metropolitan area network (MAN), and/or Internet.

FIG. 1 merely depicts an exemplary networking environment 100, which should not unduly limit the scope of the disclosure. Persons skilled in the art can recognize many variations, alternatives, and modifications of embodiments of the present disclosure. For example, functions performed by the first user device 104 and the second user device 106 may be interchanged. The second user device 106 may transmit data packets for encryption and the first user device 104 may receive data packets with payloads constituting decrypted texts. Similarly, functions performed by the first electronic device 108 and the second electronic device 110 may be interchanged. The second electronic device 110 may encrypt plaintexts and the second electronic device 110 may decrypt ciphertexts. In some embodiments, the functions performed by the first electronic device 108 may be performed by the first user device 104 and the functions performed by the second electronic device 110 may be performed by the second user device 106. In such embodiments, the networking environment 100 may not include the first electronic device 108 and the second electronic device 110, or both the first electronic device 108 and the second electronic device 110 may be redundant.

Figure 2:
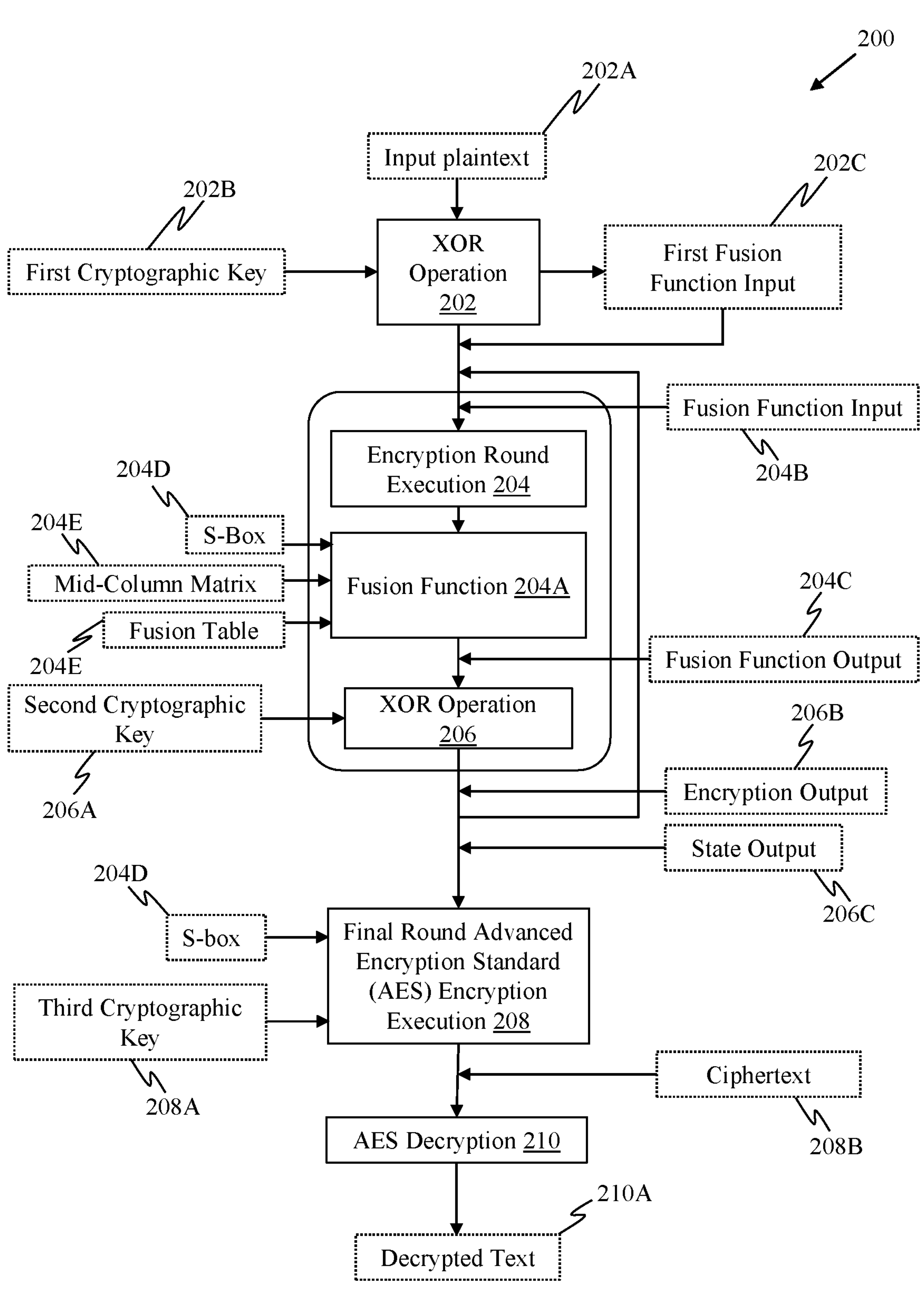
FIG. 2 is a block diagram that illustrates an exemplary sequence of steps whose execution allows implementation of AES with secure S-box generation, and fusion function application, in accordance with an embodiment of the present disclosure.

FIG. 2 is a block diagram 200 that illustrates an exemplary sequence of steps whose execution allows implementation of AES with secure S-box generation, and fusion function application, in accordance with an embodiment of the present disclosure. FIG. 2 is described in conjunction with elements from FIG. 1. With reference to FIG. 2, there is shown the sequence of steps 202-210 for the implementation of AES using secured S-box and a fusion function that fuses the functions of SubBytes, ShiftRows, and MixColumns of conventional AES. It may be noted that steps 202, 204, 206, and 208 are executed by the first electronic device 108 and step 210 is executed by the second electronic device 110.

At 202, an XOR operation is performed on an input plaintext 202A and a first cryptographic key 202B. In accordance with an embodiment, data, that is to be secured, may be received from a user device (such as the first user device 104). The first cryptographic key 202B may be received from a master server (such as the server 102). From the data, the input plaintext 202A may be extracted. The input plaintext 202A is required to be encrypted using AES based on a secure S-box and the fusion function. The input plaintext 202A may include a predefined number of bits/bytes. The number of bits/bytes included in the input plaintext 202A is identical to key-length of the first cryptographic key 202B. The performance of the XOR operation of the input plaintext 202A and the first cryptographic key 202B results in obtaining a first fusion function input 202C.

For example, if the key-length of the first cryptographic key 202B is 128 bits, then the number of bits/bytes included in the input plaintext 202A is also 128 bits. Each of the input plaintext 202A and the first cryptographic key 202B may be represented as a 16-element matrix that comprises four rows and four columns. Each element includes 8 bits that is within a range 00-FF in hexadecimal number format. An element-wise XOR operation may be performed between a first matrix representing the input plaintext 202A and a second matrix representing the first cryptographic key 202B to generate a third matrix as output. The third matrix represents the first fusion function input 202C. In other words, if "$P_{00}$" represents an element of the first row and the first column of the first matrix and "$K_{00}$" represents an element of the first row and the first column of the second matrix, then an outcome "$P_{00} \oplus K_{00}$" represents an element of the first row and the first column of the third matrix. The XOR operation may be a bit-wise operation. Thus, each bit of "$P_{00}$" is XOR-ed with each bit of "$K_{00}$" to obtain the outcome. Thus, the third matrix (i.e., the first fusion function input 202C) is a 16-element matrix that comprises four rows and four columns. Each element includes 8 bits that can be within a range 00-FF in hexadecimal number format.

At 204, a set of encryption rounds may be executed for generating a state output. The execution of the set of encryption rounds is based on a fusion function 204A. The fusion function 204A may be applied on a fusion function input 204B for generating a fusion function output 204C. Thus, the fusion function 204A may receive the fusion function input 204B and generate the fusion function output 204C at each instance of execution of an encryption round of the set of encryption rounds. For instance, the first fusion function input 202C is the fusion function input 204B for a first encryption round of the set of encryption rounds. However, for generation of the fusion function output 204C, the fusion function 204A needs to be applied on additional data. In accordance with an embodiment, the additional data includes an S-box 204D of a set of S-boxes, a mix-column matrix 204E of a set of mix-column matrices, and a fusion table 204F. The set of S-boxes and the set of mix-column matrices may be generated by the master server (such as the server 102).

The generated set of S-boxes and the generated set of mix-column matrices may be received along with the first cryptographic key 202B. The S-box 204D may be selected from amongst the set of S-boxes and the mix-column matrix 204E may be selected from amongst the set of mix-column matrices. It may be noted that another S-box may be selected from amongst the set of S-boxes and another mix-column matrix may be selected from amongst the set of the mix-column matrices for encrypting another plaintext. The fusion table 204F is obtained based on the selected S-box 204D and the selected mix-column matrix 204E.

Each of the selected S-box 204D and the selected mix-column matrix 204E may include a predefined number of elements. The number of elements included in each of the selected S-box 204D and the selected mix-column matrix 204E depends on the key-length and a number of key-segments of the first cryptographic key 202B. For example, if the key-length is 128 bits or 16 bytes and the number of key-segments is 16, then the number of elements included in the selected S-box 204D is 256 and the number of elements included in the selected mix-column matrix 204E is 16. The selected S-box 204D is a matrix that comprises sixteen rows and sixteen columns. Each element of the selected S-box 204D is unique and comprises 8 bits. A value of each element is within a predefined range. For example, the range may be 00-FF in hexadecimal number format. The selected mix-column matrix 204E comprises four rows and four columns. Each element includes 8 bits that can be within a range 00-FF in hexadecimal number format. Thus, the fusion function output 204C generated at each instance of execution of an encryption round is obtained based on application of the fusion function 204A on each of the fusion function input 204B (such as the first fusion function input 202C for the first encryption round), the selected S-box 204D, the selected mix-column matrix 204E, and the fusion table 204F.

$$\begin{bmatrix} M_{00} & M_{01} & M_{02} & M_{03} \\ M_{08} & M_{09} & M_{10} & M_{11} \end{bmatrix} = M_{12} \quad M_{13} \quad M_{14} \quad M_{15}$$

an example of the selected mix-column matrix 204E that comprises

In accordance with an embodiment, for each element of the selected mix-column matrix 204E, a set of entries may be obtained. Thus, a set of entries may be obtained for each of the sixteen elements of the selected mix-column matrix 204E. Each entry of the set of entries is a product of a value of the corresponding element of the selected mix-column matrix 204E and a number within a predefined range. For instance, each entry of the set of entries obtained for $M_{00}$ will be a product of "02" and a number that is within the predefined range. A count of entries included in the set of entries obtained for each element of the mix-column matrix 204E is a number that constitutes an upper limit within the predefined range.

In accordance with an embodiment, value of each element of the selected S-box 204D is a number within the predefined range. As mentioned previously, the number of elements included in the selected S-box 204D is 256, each element of the selected S-box 204D is unique, and a value of each element is within the predefined range 00-FF. Thus, the predefined range is 00-FF, the upper limit within the predefined range is FF, and a count of entries included in the set of entries obtained for each element of the selected mix-column matrix 204E is FF (i.e., 256). The count of entries included in the set of entries, obtained for each element of the selected mix-column matrix 204E, is equal to a count of elements in the selected S-box 204D (which is 256 as per the example).

Based on the above, each entry of the set of entries is a product of a value of the corresponding element of the selected mix-column matrix 204E and a number in the range "00"-"FF". Furthermore, since the count of entries included in the set of entries is "FF", a product of the corresponding element of the selected mix-column matrix 204E and each number in the range "00"-"FF" is determined. For instance, a product of "02" (value of $M_{00}$) and each number within the range "00"-"FF" is determined. Thus, 256 products may be determined for each element of the selected mix-column matrix 204E. The 256 products constitute the set of entries obtained for each element of the selected mix-column matrix 204E. The fusion table 204F is obtained based on the set of entries obtained for each element of the selected mix-column matrix 204E. The fusion table 204F is obtained further based on a value of each element of the selected S-box 204D.

The following is an example of the fusion table 204F:

$$T0[S(i)] = |M_{00} * S(i)|M_{04} * S(i)\,|\,M_{08} * S(i)|M_{12} * S(i)|$$

$$T1[S(i)] = |M_{01} * S(i)|M_{05} * S(i)\,|\,M_{09} * S(i)|M_{13} * S(i)|$$

$$T2[S(i)] = |M_{02} * S(i)|M_{06} * S(i)\,|\,M_{10} * S(i)|M_{14} * S(i)|$$

$$T3[S(i)] = |M_{03} * S(i)|M_{07} * S(i)\,|\,M_{11} * S(i)|M_{15} * S(i)|$$

Here, "S(i)" represents a value of an $i^{th}$ element of the selected S-box 204D. Since there are 256 elements in the selected S-box 204D, "i" can vary in the range 00-FF.

The fusion function 204A may receive the fusion function input 204B, the selected S-box 204D, the selected mix-column matrix 204E, and the fusion table 204F as inputs to generate the fusion function output 204C at each instance of execution of an encryption round of the set of encryption rounds. In accordance with an embodiment, the fusion function input 204B is a matrix. A count of elements, a count of rows, and a count of columns in each of the fusion function input 204B and the selected mix-column matrix 204E is identical. Thus, the fusion function input 204B is a 16-element matrix that comprises four rows and four columns. Each element includes 8 bits that can be within a range 00-FF in hexadecimal number format. For the first encryption round, the first fusion function input 202C is the fusion function input 204B. As mentioned earlier, the first fusion function input 202C is a 16-element matrix that is obtained based on performance of an element-wise XOR operation between the first matrix representing the input plaintext 202A and the second matrix representing the first cryptographic key 202B.

For example, a first column of the first fusion function input 202C includes elements with values "19", "F4", "8D", and "08". Based on the elements, values of elements S(19), S (F4), S(8D), and S(08) of the selected S-box 204D may be relevant for determination of fusion function output 204C during the execution of the first encryption round of the set of encryption rounds. The value of S(19) is a number at the $1^{st}$ row and the $9^{th}$ column of the selected S-box 204D. For example, the number may be "D4". Similarly, the values of S(F4), S(8D), and S(08) may be "BF", "5D", and "30" respectively.

In accordance with an embodiment, an entry of the set of entries may be selected for each element in a first row of the selected mix-column matrix 204E. Thus, an entry may be selected from amongst the set of entries obtained for each of $M_{00}$, $M_{01}$, $M_{02}$, and $M_{03}$. The entry selected for each element is a product of a value of the corresponding element in the first row of the selected mix-column matrix 204E and a number within the predefined range. For instance, the entry selected for $M_{00}$ is a product of "02" and a number within the range 00-FF. The number is determined based on an element of a first column of the fusion function input 204B (first fusion function input 202C for execution of the first encryption round) and the selected S-box 204D. For execution of the first encryption round, the number is determined based on value of an element at the first row and first column of the first fusion function input 202C and an element of the selected S-box 204D that is associated with the element at the first row and first column of the first fusion function input 202C. The value of the element at the first row and first column of the first fusion function input 202C is "19" and the associated element of the selected S-box 204D is S(19). The number is determined as "D4". Therefore, the entry selected for $M_{00}$ is a product of "02" and "D4".

Similarly, the entry selected for $M_{01}$ is a product of "03" and "BF". Here, the number is determined based on value of an element at the second row and first column of the first fusion function input 202C and an element of the selected S-box 204D that is associated with the element at the second row and first column of the first fusion function input 202C. The entry selected for $M_{02}$ is a product of "01" and "5D". Here, the number is determined based on value of an element at the third row and first column of the first fusion function input 202C and an element of the selected S-box 204D that is associated with the element at the third row and first column of the first fusion function input 202C. The entry selected for $M_{03}$ is a product of "01" and "30" respectively. Here, the number is determined based on value of an element at the fourth row and first column of the first fusion function input 202C and an element of the selected S-box 204D that is associated with the element at the fourth row and first column of the first fusion function input 202C. The products can be fetched from the fusion table 204F. The fetched products are "1A8", "23D", "5D", and "30" respectively. If a fetched product includes more than eight bits, then the rightmost 8 bits may be stored. In the above example, "1A8" and "23D" may be transformed into "A8" and "3D" respectively.

Once the entry (i.e., the product) is selected (i.e., fetched from the fusion table 204F), an XOR operation may be performed based on the entry selected for each element in a first row of the selected mix-column matrix 204E. Based on the above example, an XOR operation may be performed as follows: "A8"⊕"3D"⊕"5D"⊕"30". An outcome of the XOR operation is "F8". The outcome is a value of an element at a first row and first column (for example, $I_{00}$) of an intermediate matrix (for example, I). A count of elements, a count of rows, and a count of columns in each of the fusion function input 204B (first fusion function input 202C for execution of the first encryption round), the selected mix-column matrix 204E, and the intermediate matrix is identical. Thus, the intermediate matrix is a 16-element matrix that comprises four rows and four columns. Each element includes 8 bits that can be within a range 00-FF in hexadecimal number format. Each element of a first column of an intermediate matrix is determined by performing XOR operations based on an entry selected for each element in each row of the selected mix-column matrix 204E. The elements of the first column of the intermediate matrix can be represented as $I_{00}$, $I_{04}$, $I_{08}$, and $I_{12}$. The determination of $I_{00}$ has been discussed. The determination of each of $I_{04}$, $I_{08}$, and $I_{12}$ is discussed as follows.

For determination of 104, an entry of the set of entries may be selected for each element in a second row of the selected mix-column matrix 204E. Thus, an entry of the set of entries obtained for each of $M_{04}$, $Mo_{05}$, $M_{06}$, and $M_{07}$ may be selected. The entry selected for each element is a product of a value of the corresponding element in the second row of the selected mix-column matrix 204E and a number within the predefined range. The number used for determination of the entry selected for each element is determined based on elements of the first column of the first fusion function input 202C and elements of the selected S-box 204D associated with the elements of the first column of the first fusion function input 202C. Therefore, the entry selected for $M_{04}$ is a product of "01" and "D4", the entry selected for $M_{05}$ is a product of "02" and "BF", the entry selected for $M_{06}$ is a product of "03" and "5D", and the entry selected for $M_{07}$ is a product of "01" and "30" respectively.

The products can be fetched from the fusion table 204F. The fetched products are "D4", "17E", "117", and "30". Thereafter, an XOR operation may be performed as follows: "D4"⊕"7E"⊕"17"⊕"30". An outcome of the XOR operation is a value of an element at a second row and first column (i.e., $I_{04}$) of the intermediate matrix (i.e., I).

For determination of $I_{08}$, an entry of the set of entries may be selected for each element in a third row of the selected mix-column matrix 204E. Thus, an entry of the set of entries obtained for each of $M_{08}$, $M_{09}$, $M_{10}$, and $M_{11}$ may be selected. The entry selected for each element is a product of a value of the corresponding element in the third row of the selected mix-column matrix 204E and a number within the predefined range. The number used for determination of the entry selected for each element is determined based on elements of the first column of the first fusion function input 202C and elements of the selected S-box 204D associated with the elements of the first column of the first fusion function input 202C. Therefore, the entry selected for $M_{08}$ is a product of "01" and "D4", the entry selected for $M_{00}$ is a product of "01" and "BF", the entry selected for $M_{10}$ is a product of "02" and "5D", and the entry selected for $M_{11}$ is a product of "03" and "30" respectively. An outcome of an XOR operation of the products is a value of an element at a third row and first column (i.e., $I_{08}$) of the intermediate matrix (i.e., I).

For determination of $I_{12}$, an entry of the set of entries may be selected for each element in a fourth row of the selected mix-column matrix 204E. Thus, an entry of the set of entries obtained for each of $M_{12}$, $M_{13}$, $M_{14}$, and $M_{15}$ may be selected. The entry selected for each element is a product of a value of the corresponding element in the fourth row of the selected mix-column matrix 204E and a number within the predefined range. The number used for determination of the entry selected for each element is determined based on elements of the first column of the first fusion function input 202C and elements of the selected S-box 204D associated with the elements of the first column of the first fusion function input 202C. Therefore, the entry selected for $M_{12}$ is a product of "03" and "D4", the entry selected for $M_{13}$ is a product of "01" and "BF", the entry selected for $M_{14}$ is a product of "01" and "5D", and the entry selected for $M_{15}$ is a product of "02" and "30" respectively. An outcome of an XOR operation of the products is a value of an element at a fourth row and first column (i.e., $I_{12}$) of the intermediate matrix (i.e., I).

It may be noted that elements of the second column of the intermediate matrix, i.e., $I_{01}$, $I_{05}$, $I_{09}$, and $I_{13}$, may be determined based on outcomes of XOR operations that are similar to those performed for the determination of $I_{00}$, $I_{04}$, $I_{08}$, and $I_{12}$. For instance, the XOR operation for determination of $I_{01}$ is performed based on the elements of the first row of the selected mix-column matrix 204E and the elements of the second column of the first fusion function input 202C. The XOR operation for determination of $I_{05}$ is performed based on the elements of the second row of the selected mix-column matrix 204E and the elements of the second column of the first fusion function input 202C. The XOR operation for determination of $I_{09}$ is performed based on the elements of the third row of the selected mix-column matrix 204E and the elements of the second column of the first fusion function input 202C. The XOR operation for determination of $I_{13}$ is performed based on the elements of the fourth row of the selected mix-column matrix 204E and the elements of the second column of the first fusion function input 202C.

Furthermore, elements of the third column of the intermediate matrix are $I_{02}$, $I_{06}$, $I_{10}$, and $I_{14}$. The XOR operation for determination of $I_{02}$ is performed based on the elements of the first row of the selected mix-column matrix 204E and the elements of the third column of the first fusion function input 202C. The XOR operation for determination of $I_{06}$ is performed based on the elements of the second row of the selected mix-column matrix 204E and the elements of the third column of the first fusion function input 202C. The XOR operation for determination of $I_{10}$ is performed based on the elements of the third row of the selected mix-column matrix 204E and the elements of the third column of the first fusion function input 202C. The XOR operation for determination of $I_{14}$ is performed based on the elements of the fourth row of the selected mix-column matrix 204E and the elements of the third column of the first fusion function input 202C.

Furthermore, elements of the fourth column of the intermediate matrix are $I_{03}$, $I_{07}$, $I_{11}$, and $I_{15}$. The XOR operation for determination of $I_{03}$ is performed based on the elements of the first row of the selected mix-column matrix 204E and the elements of the fourth column of the first fusion function input 202C. The XOR operation for determination of $I_{07}$ is performed based on the elements of the second row of the selected mix-column matrix 204E and the elements of the fourth column of the first fusion function input 202C. The XOR operation for determination of $I_{11}$ is performed based on the elements of the third row of the selected mix-column matrix 204E and the elements of the fourth column of the first fusion function input 202C. The XOR operation for determination of $I_{15}$ is performed based on the elements of the fourth row of the selected mix-column matrix 204E and the elements of the fourth column of the first fusion function input 202C.

$$\begin{bmatrix} I_{00} & I_{01} & I_{02} & I_{03} \\ I_{08} & I_{09} & I_{10} & I_{11} \\ I_{12} & I_{13} & I_{14} & I_{15} \end{bmatrix}$$

ned exemplary intermediate matrix is represented as follows:

$$[\, I_{01} \quad I_{02} \quad I_{03} \quad I_{00}$$

that an intermediate matrix may be similarly determined for each of the other encryption rounds. The determination may be based on the fusion function input 202C or the corresponding other encryption rounds. In accordance with an embodiment, after the etermination of the intermediate matrix, a circular right-shift operation may be performed on each row of the intermediate matrix. The circular right-shift operation may include shifting of elements of a first row of the intermediate matrix by three positions, shifting of elements of a second row of the intermediate matrix by two positions, and shifting of elements of a third row of the intermediate matrix by one position. The fusion function output 204C (F/O) is obtained based on the performance of the circular right-shift operation. Thus, the fusion function output 204C is represented as follows:

| | | | |
|---|---|---|---|
| $I_{06}$ | $I_{07}$ | $I_{04}$ | $I_{05}$ |
| $I_{12}$ | $I_{13}$ | $I_{14}$ | $I_{15}$ |

At 206, an XOR operation is performed on the fusion function output 204C and a second cryptographic key 206A for obtaining an encryption output 206B. A key-length of the of the second cryptographic key 206A is identical to that of the first cryptographic key 202B. For example, if the key-length of the first cryptographic key 202B is 128 bits, then the key-length of the second cryptographic key 206A is also 128 bits. Each of the fusion function output 204C and the second cryptographic key 206A may be represented as a 16-element matrix that comprises four rows and four columns. Each element includes 8 bits that is within a range 00-FF in hexadecimal number format. An element-wise XOR operation may be performed between the matrix representing the fusion function output 204C and the matrix representing the second cryptographic key 206A to generate a matrix that represents the encryption output 206B. Thus, if "101" represents an element of the first row and the first column of the fusion function output 204C and "$K_{00}$" represents an element of the first row and the first column of the second cryptographic key 206A, then an outcome "$I_{01} \oplus K_{00}$" represents an element of the first row and the first column of the encryption output 206B. The XOR operation may be a bit-wise operation. Thus, each bit of "$I_{01}$" is XOR-ed with each bit of "$K_{00}$" to obtain the outcome. Thus, the encryption output 206B is a 16-element matrix that comprises four rows and four columns. Each element includes 8 bits that can be within a range 00-FF in hexadecimal number format.

The encryption output 206B obtained after execution of a particular encryption round is the fusion function input 204B for a following encryption round. For instance, the encryption output 206B obtained after execution of the first encryption round is the fusion function input 204B for a second encryption round. For execution of the second encryption round, steps 204 and 206 are executed again. This involves application of the fusion function 204A on the encryption output 206B (i.e., the fusion function input 204B) obtained after execution of the first encryption round. After execution of the second encryption round, another encryption output 206B is obtained. This encryption output 206B is the fusion function input 204B for a second encryption round. The encryption output 206B obtained after execution of a last encryption round is the state output 206C. The second cryptographic key 206A is different for each encryption round. Thus, the second cryptographic key 206A used for performing the XOR operation at step 206 is different for each encryption round of the set of encryption rounds. For execution of the set of encryption rounds, a set of second cryptographic keys are generated. The generation of the set of second cryptographic keys is based on an expansion of the first cryptographic key 202B. The set of second cryptographic keys may be received from the master server (such as the server 102) along with the first cryptographic key 202B. For execution of each encryption round a second cryptographic key 206A is selected from amongst the set of second cryptographic keys.

At 208, a final round of AES encryption is executed based on the state output 206C, the selected S-box 204D, and a third cryptographic key 208A to obtain a ciphertext 208B. The third cryptographic key 208A is generated based on the first cryptographic key 202B and received from the master server (such as the server 102) along with the first cryptographic key 202B and the set of second cryptographic keys. A key-length of the third cryptographic key 208A is identical to that of the first cryptographic key 202B. For example, if the key-length of the first cryptographic key 202B is 128 bits, then the key-length of the third cryptographic key 208A is also 128 bits. The third cryptographic key 208A may be represented as a 16-element matrix that comprises four rows and four columns. Each element includes 8 bits that is within a range 00-FF in hexadecimal number format. The execution of the final round of AES encryption is based on convention functions, viz., SubBytes and ShiftRows. The selected S-box 204D is inputted to the SubBytes function during execution of the final round of AES encryption. The third cryptographic key 208A is used as a cryptographic key for execution of the final round of AES encryption and generation of the ciphertext 208B. The ciphertext 208B may include a predefined number of bits/bytes. The number of bits/bytes included in the ciphertext 208B is identical to key-length of the first cryptographic key 202B. The ciphertext 208B may be represented as a 16-element matrix that comprises four rows and four columns. Each element includes 8 bits that is within a range 00-FF in hexadecimal number format.

In accordance with an embodiment, a count of bits included in each of the input plaintext 202A, the first cryptographic key 202B, the second cryptographic key 206A, the third cryptographic key 208A, the state output, 206C, and the ciphertext 208B, is equal. A count of bits included in the first cryptographic key 202A (i.e., key-length of the first cryptographic key 202A) is one of: 128 bits, 192 bits, 256 bits, 384 bits, or 512 bits. The examples used for referring to matrices representing each of the input plaintext 202A, the first cryptographic key 202B, the second cryptographic key 206A, the third cryptographic key 208A, the state output, 206C, and the ciphertext 208B is applicable for the scenario when the key-length of the first cryptographic key 202A is 128 bits.

At 210, an AES decryption procedure is executed for obtaining a decrypted text 210A from the ciphertext 208B. The decrypted text 210A is identical to the input plaintext 202A. The AES decryption procedure is performed based on an inverse S-box and an inverse mix-column matrix. The inverse S-box is obtained based on the selected S-box 204D of the set of S-boxes, and the inverse mix-column matrix is obtained based on the selected mix-column matrix 204E of the set of mix-column matrices. The inverse S-box is obtained by computing an inverse of the selected S-box 204D and the inverse mix-column matrix is obtained by computing an inverse of the selected mix-column matrix 204E.

In accordance with an embodiment, the generation of each S-box of the set of S-boxes complies with predefined security criteria. The compliance with the predefined security criteria ensures that the generated set of S-boxes are secure. The predefined security criteria include ensuring that an element order associated with each S-box of the set of S-boxes (such as the selected S-box 204D) is greater than 88, ensuring that count of coefficients of a Lagrange polynomial associated with each S-box of the set of S-boxes is greater than or equal to 250, and ensuring that highest degree of the Lagrange polynomial is greater than or equal to 254. For ensuring that AES encryption (steps 202-208) is effective in a quantum computing environment, a different S-box (other than the selected S-box 204D) may be selected from amongst the set of S-boxes for encrypting a plaintext that follows the input plaintext 202A. An interval between selection of each pair of S-boxes of the set of S-boxes is less than a first predefined interval. For instance, the interval is a time that elapses between the selection of the S-box 204D (involved in encryption of the input plaintext 202A) and selection of another S-box (involved in encryption of the plaintext that follows the input plaintext 202A). Thus, at least two ciphertexts can be generated within the first predefined interval. One of the ciphertexts is the ciphertext 208B and the other ciphertext corresponds to the plaintext that follows the input plaintext 202A. The selection of a different S-box within the first predefined interval ensures robustness of AES encryption (steps 202-208).

In accordance with an embodiment, each mix-column matrix (such as the selected mix-column matrix 204E) of the set of mix-column matrices complies with a predefined criterion. The predefined criterion is ensuring that each mix-column matrix of the set of mix-column matrices is invertible. An interval between the generation of each pair of mix-column matrices of the set of mix-column matrices is less than a second predefined interval. For instance, the interval is a time that elapses between the selection of the mix-column matrix (involved in encryption of the input plaintext 202A) and selection of another mix-column matrix (involved in encryption of the plaintext that follows the input plaintext 202A). The selection of different mix-column matrices for encryption of different plaintexts ensures that AES encryption (steps 202-208) is effective in a quantum computing environment. Since the selection of a pair of mix-column matrices takes place within the second predefined interval, at least two ciphertexts can be generated within the second predefined interval. One of the ciphertexts is the ciphertext 208B and the other ciphertext corresponds to the plaintext that follows the input plaintext 202A.

Each of the first predefined interval and the second predefined interval is such that it is impossible for the first cryptographic key 202B to get compromised within the first predefined interval and the second predefined interval. For the first cryptographic key 202B to get compromised, an adversary needs to ensure (at least by use of quantum computing) that $2^{37.15}$ offline operations are executed within the first predefined interval and the second predefined interval. This is because S-box and mix-column matrix is updated within the first predefined interval and the second predefined interval respectively.

The steps 202-210 are illustrative, and other alternatives can also be provided where one or more steps are added, one or more steps are provided in a different sequence, or one or more steps are eliminated, without departing from the scope of the claims herein.

FIG. 3 is a flowchart 300 that illustrates a method for implementing AES with frequent S-box update and fusion function application, in accordance with an embodiment of the present disclosure. FIG. 3 is described in conjunction with elements from FIG. 1 and FIG. 2. With reference to FIG. 3, there is shown the flowchart 300. The flowchart 300 includes steps 302, 304 (304A and 304B), and 306. The first electronic device 108 is configured to execute the method for implementing AES with frequent S-box update and fusion function application.

At step 302, a first fusion function input is obtained based on performance of an XOR operation on an input plaintext and a first cryptographic key. In accordance with an embodiment, the first electronic device 108 is configured to receive, from the server 102, a set of AES parameters that includes the first cryptographic key. The first electronic device 108 is further configured to receive, from the first user device 104, the input plaintext. The first electronic device 108 obtains the first fusion function input by performing the XOR operation on the input plaintext and the first cryptographic key. Details associated with obtaining the first fusion function input have been discussed in FIG. 1 and FIG. 2.

At step 304, a set of encryption rounds are executed for generating a state output. In accordance with an embodiment, the first electronic device 108 is configured to execute the set of encryption rounds to generate a state output. The execution of the set of encryption rounds includes steps 304A and 304B.

At step 304A, a fusion function is applied on a fusion function input for generating a fusion function output. In accordance with an embodiment, the first electronic device 108 is configured to apply the fusion function on the fusion function input to generate the fusion function output. The first fusion function input is the fusion function input for a first encryption round of the set of encryption rounds. The fusion function may generate the fusion function output based on an S-box of a set of S-boxes, a mix-column matrix of a set of mix-column matrices, and a fusion table. The fusion table is obtained based on the S-box and the mix-column matrix.

At step 304B, an XOR operation is performed on the fusion function output and a second cryptographic key for obtaining an encryption output. In accordance with an embodiment, the first electronic device 108 is configured to perform the XOR operation on the fusion function output and a second cryptographic key of the set of second cryptographic keys to obtain an encryption output. The encryption output after execution of a particular encryption round is the fusion function input for a following encryption round. The encryption output obtained after execution of a last encryption round is the state output. It is to be noted that the second cryptographic key is different for each encryption round. Details associated with execution of the set of encryption rounds for generation of the state output have been discussed in FIG. 1 and FIG. 2.

At step 306, a final round of AES encryption is executed based on the state output, the S-box, and a third cryptographic key to obtain a ciphertext. In accordance with an embodiment, the first electronic device 108 is configured to execute the final round of AES encryption based on the state output, the S-box, and a third cryptographic key to obtain the ciphertext. The third cryptographic key is generated based on the first cryptographic key.

The steps 302, 304 (304A and 304B), and 306, are only illustrative, and other alternatives can also be provided where one or more steps are added, or one or more steps are provided in a different sequence without departing from the scope of the claims herein.

There is provided a computer program comprising instructions for carrying out all the steps of the method. The computer program is executed on a computer system. The computer program is implemented as an algorithm, embedded in a software stored in the non-transitory computer-readable storage medium having program instructions stored thereon, the program instructions being executable by the one or more processors in the computer system to execute the method illustrated using the flowchart 300. The non-transitory computer-readable storage means may include, but are not limited to, an electronic storage device, a magnetic storage device, an optical storage device, an electromagnetic storage device, a semiconductor storage device, or any suitable combination of the foregoing. Examples of implementation of computer-readable storage medium, but are not limited to, an Electrically Erasable Programmable Read-Only Memory (EEPROM), a Random Access Memory (RAM), a Read Only Memory (ROM), a Hard Disk Drive (HDD), a Flash memory, a Secure Digital (SD) card, a Solid-State Drive (SSD), a computer-readable storage medium, and/or a CPU cache memory.

Figure 4A:
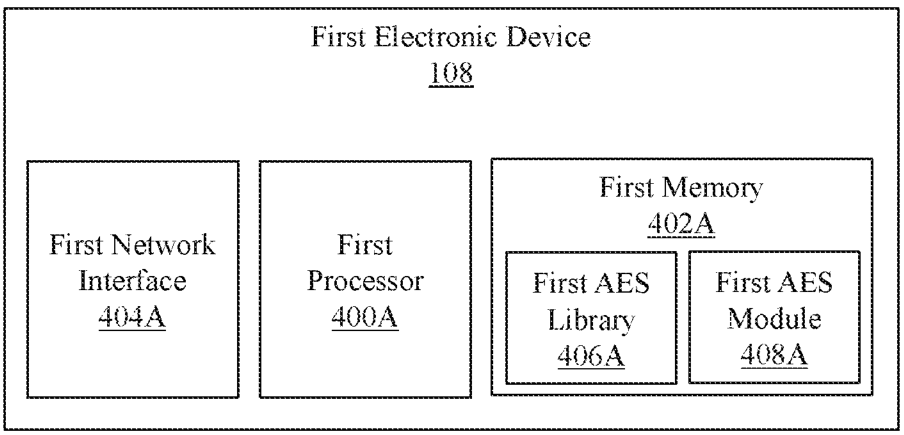
FIG. 4A illustrates a first electronic device for implementing AES encryption with frequent S-box update and fusion function application, in accordance with an embodiment of the present disclosure.

FIG. 4A illustrates a first electronic device for implementing AES encryption with frequent S-box update and fusion function application, in accordance with an embodiment of the present disclosure. FIG. 4A is described in conjunction with elements from FIG. 1, FIG. 2, and FIG. 3. With reference to FIG. 4A, there is shown the first electronic device 108. The first electronic device 108 includes a first processor 400A, a first memory 402A, and a first network interface 404A. The first memory 402A further includes a first AES library 406A that is configured to implement AES encryption using the fusion function. In some embodiments, the first memory 402A further includes a first AES module 408A that is also configured to implement AES encryption using the fusion function. In an example, the first electronic device 108 is a switch.

In accordance with an embodiment, the first electronic device 108 may support building a communication network and use the first AES library 406A or the first AES module 408A in AES-CTR mode to encrypt data. Furthermore, the first electronic device 108 may use the first AES library 406A or the first AES module 408A in AES-CTR mode to decrypt data as well. Both the first AES library 406A and the first AES module 408A may support key-length of 128 bits, 192 bits, 256 bits, 384 bits, or 512 bits. The first AES library 406A and the first AES module 408A utilize the fusion function to encrypt data and prevent side-channel attacks.

The first processor 400A refers to a computational element that is operable to respond to and processes instructions that drive the first electronic device 108. The first processor 400A may refer to one or more individual processors, processing devices, and various elements associated with a processing device that may be shared by other processing devices. Additionally, the one or more individual processors, the processing devices, and the various elements are arranged in various architectures for responding to and processing the instructions that drive the first electronic device 108. In some implementations, the first processor 400A may be an independent unit.

In a first embodiment, the first processor 400A is configured to perform a first set of operations by use of the first AES library 406A. The first set of operations include reception of the set of AES parameters and the input plaintext, obtaining the first fusion function input, execution of the set of encryption rounds, obtaining the ciphertext, and transmission of the ciphertext to the second electronic device 110 (see FIG. 1).

In a second embodiment, the first processor 400A is configured to receive the set of AES parameters and the input plaintext and transmit the set of AES parameters and the input plaintext to the first AES module 408A. In some scenarios, the first processor 400A transmits the set of AES parameters and the input plaintext to the first AES module 408A through Direct Memory Access (DMA). The first AES module 408A is configured to obtain the first fusion function input, execute the set of encryption rounds, obtain the ciphertext, and transmit the ciphertext to the first processor 400A. In some scenarios, the first AES module 408A may transmit the ciphertext to the first processor 400A through DMA. The first processor 400A is further configured to transmit the ciphertext to the second electronic device 110.

Examples of the first processor 400A may include, but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The first memory 402A refers to a volatile or persistent medium, such as an electrical circuit, magnetic disk, virtual memory, or optical disk, in which a computer can store data or software for any duration. Optionally, the first memory 402A is a non-volatile mass storage, such as a physical storage media. Examples of implementation of the first memory 402A may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The first network interface 404A refers to a communication interface to enable the first electronic device 108 to communicate with the server 102, the first user device 104, and the second electronic device 110. Examples of the first network interface 404A include, but are not limited to, a network interface card, a transceiver, and the like.

Figure 4B:
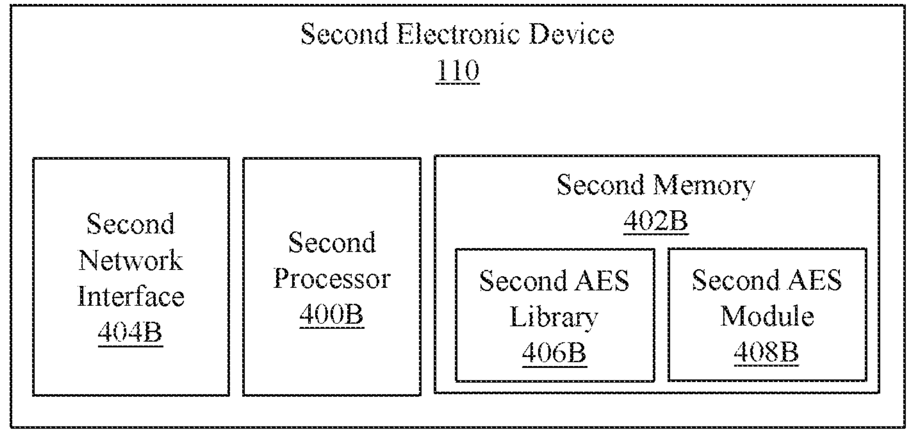
FIG. 4B illustrates a second electronic device for implementing AES decryption, in accordance with an embodiment of the present disclosure.

FIG. 4B illustrates a second electronic device for implementing AES decryption, in accordance with an embodiment of the present disclosure. FIG. 4B is described in conjunction with elements from FIG. 1, FIG. 2, FIG. 3, and FIG. 4A. With reference to FIG. 4B, there is shown the second electronic device 110. The second electronic device 110 includes a second processor 400B, a second memory 402B, and a second network interface 404B. The second memory 402B further includes a second AES library 406B that is configured to implement AES decryption. In some embodiments, the second memory 402B further includes a second AES module 408B that is also configured to implement AES decryption. In an example, the second electronic device 110 is a switch.

In accordance with an embodiment, the second electronic device 110 supports building a communication network and uses the second AES library 406B or the second AES module 408B in AES-CTR mode to decrypt data. Furthermore, the second electronic device 110 may use the second AES library 406B or the second AES module 408B in AES-CTR mode to encrypt data as well. Both the second AES library 406B and the second AES module 408B may support key-length of 128 bits, 192 bits, 256 bits, 384 bits, or 512 bits.

The second processor 400B refers to a computational element that is operable to respond to and processes instructions that drive the second electronic device 110. The second processor 400B may refer to one or more individual processors, processing devices, and various elements associated with a processing device that may be shared by other processing devices. Additionally, the one or more individual processors, the processing devices, and the various elements are arranged in various architectures for responding to and processing the instructions that drive the second electronic device 110. In some implementations, the second electronic device 110 may be an independent unit.

In a first embodiment, the second processor 400B is configured to perform a second set of operations by use of the second AES library 406B. The second set of operations include reception of the set of AES parameters and the ciphertext, obtaining the decrypted text, and transmission of the decrypted text to the second user device 106 (sec FIG. 1).

In a second embodiment, the second processor 400B is configured to receive the set of AES parameters and the ciphertext and transmit the set of AES parameters and the ciphertext to the second AES module 408B. In some scenarios, the second processor 400B transmits the set of AES parameters and the ciphertext to the second AES module 408B through DMA. The second AES module 408B is configured to obtain the decrypted text and transmit the decrypted text to the second processor 400B. In some scenarios, the second AES module 408B may transmit the decrypted text to the second processor 400B through DMA. The second processor 400B is further configured to transmit the decrypted text to the second user device 106.

Examples of the second processor 400B may include, but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The second memory 402B refers to a volatile or persistent medium, such as an electrical circuit, magnetic disk, virtual memory, or optical disk, in which a computer can store data or software for any duration. Optionally, the second memory 402B is a non-volatile mass storage, such as a physical storage media. Examples of implementation of the second memory 402B include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The second network interface 404B refers to a communication interface to enable the second electronic device 110 to communicate with the server 102, the second user device 106, and the first electronic device 106. Examples of the second network interface 404B include, but are not limited to, a network interface card, a transceiver, and the like.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A method comprising:

obtaining a first fusion function input based on performance of an XOR operation on an input plaintext and a first cryptographic key;

executing a set of encryption rounds for generating a state output, wherein an execution of each encryption round comprises:

applying a fusion function on a fusion function input for generating a fusion function output, wherein the obtained first fusion function input is the fusion function input for a first encryption round of the set of encryption rounds, and performing an XOR operation on the fusion function output and a second cryptographic key for obtaining an encryption output, wherein the encryption output is the fusion function input for a following encryption round, wherein the encryption output obtained after execution of a last encryption round is the state output, wherein the second cryptographic key is different for each encryption round and is generated based on the first cryptographic key; and obtaining a ciphertext by executing an Advanced Encryption Standard (AES) encryption based on the state output, the S-box, and a third cryptographic key, wherein the third cryptographic key is generated based on the first cryptographic key, wherein the method further comprises generating a set of mix-column matrices, wherein each mix-column matrix of the set of mix-column matrices complies with a predefined criterion, wherein the predefined criterion is ensuring that each mix-column matrix of the set of mix-column matrices is invertible, wherein an interval between the generation of each pair of mix-column matrices of the set of mix-column matrices is less than a second predefined interval, and wherein at least two ciphertexts are generated within the second predefined interval.

2. The method according to claim 1, wherein the fusion function generates the fusion function output based on the S-box of a set of S-boxes, a mix-column matrix of the set of mix-column matrices, and a fusion table, wherein the fusion table is obtained based on the S-box and the mix-column matrix.

3. The method according to claim 2, wherein the method further comprises generating the set of S-boxes, wherein the generation of each S-box of the set of S-boxes complies with predefined security criteria, wherein an interval between selection of each pair of S-boxes of the set of S-boxes is less than a first predefined interval, and wherein the at least two ciphertexts are generated within the first predefined interval.

4. The method according to claim 1, wherein the method further comprises obtaining, for each element of the mix-column matrix, a set of entries, wherein each entry of the set of entries is a product of a value of the corresponding element of the mix-column matrix and a number within a predefined range, wherein a count of entries included in the set of entries is a number that constitutes an upper limit within the predefined range, and wherein the fusion table is obtained based on the set of entries obtained for each element of the mix-column matrix.

5. The method according to claim 4, wherein the fusion table is obtained further based on a value of each element of the S-box, wherein the value is a number within the predefined range, and wherein the count of entries included in the set of entries, obtained for each element of the mix-column matrix, is equal to a count of elements in the S-box.

6. The method according to claim 4, wherein the fusion function input is a matrix, and wherein a count of elements, a count of rows, and a count of columns in each of the fusion function input and the mix-column matrix is identical.

7. The method according to claim 6, wherein the method further comprises:

selecting an entry of the set of entries for each element in a first row of the mix-column matrix, wherein the entry selected for each element is a product of a value of the corresponding element in the first row of the mix-column matrix and a number within the predefined range, and wherein the number is determined based on an element of a first column of the fusion function input and the S-box; and performing an XOR operation based on the entry selected for each element in a first row of the mix-column matrix, wherein each element of a first column of an intermediate matrix is determined by performing XOR operations based on an entry selected for each element in each row of the mix-column matrix, and wherein a count of elements, a count of rows, and a count of columns in each of the fusion function input, the mix-column matrix, and the intermediate matrix is identical.

8. The method according to claim 7, wherein the method further comprises: performing a circular right-shift operation on each row of the intermediate matrix, wherein the circular rightshift operation comprises shifting of elements of a first row of the intermediate matrix by three positions, shifting of elements of a second row of the intermediate matrix by two positions, and shifting of elements of a third row of the intermediate matrix by one position, and wherein the fusion function output is obtained based on the performance of the circular right-shift operation.

9. The method according to claim 1, wherein a count of bits in each of the input plaintext, the first cryptographic key, the second cryptographic key, the third cryptographic key, the state output, and the ciphertext, is equal.

10. The method according to claim 9, wherein a count of bits included in the first cryptographic key is one of: 128 bits, 192 bits, 256 bits, 384 bits, or 512 bits.

11. The method according to claim 1, wherein the predefined security criteria comprises:

ensuring that an element order associated with each S-box of the set of S-boxes is greater than 88;

ensuring that count of coefficients of a Lagrange polynomial associated with each S-box is greater than or equal to 250; and ensuring that highest degree of the Lagrange polynomial is greater than or equal to 254.

12. The method according to claim 1, wherein the method further comprises obtaining a decrypted text from the ciphertext by executing an AES decryption procedure, wherein the decrypted text is identical to the input plaintext, wherein the AES decryption procedure is performed based on an inverse S-box and an inverse mix-column matrix, and wherein the inverse S-box is obtained based on the S-box of the set of S-boxes, and the inverse mix-column matrix is obtained based on the mix-column matrix of the set of mix-column matrices.

13. A system comprising:

a server, wherein the server is configured to:

generate a set of Advanced Encryption Standard (AES) parameters, wherein the set of AES parameters include a set of S-boxes, a set of mix-column matrices, a first cryptographic key, a set of second cryptographic keys, a third cryptographic key, a set of inverse S-boxes, and a set of inverse mix-column matrices, and transmit the generated set of AES parameters;

a first user device, wherein the first user device is configured to transmit an input plaintext for encryption of the input plaintext;

a second user device, wherein the second user device is configured to receive a decrypted text, wherein the decrypted text is obtained based on decryption of the encrypted version of the plaintext, and wherein the decrypted text is identical to the input plaintext;

a first electronic device, wherein the first electronic device is configured to:

receive, from the server, the set of AES parameters, receive, from the first user device, the input plaintext, obtain a first fusion function input based on performance of an XOR operation on the input plaintext and the first cryptographic key, execute a set of encryption rounds to generate a state output, wherein an execution of each encryption round comprises:

application of a fusion function on a fusion function input to generate a fusion function output, wherein the first fusion function input is the fusion function input for a first encryption round of the set of encryption rounds, and performance of an XOR operation on the fusion function output and a second cryptographic key of the set of second cryptographic keys to obtain an encryption output, wherein the encryption output is the fusion function input for a following encryption round, wherein the encryption output obtained after execution of a last encryption round is the state output, wherein the second cryptographic key is different for each encryption round, obtain a ciphertext through execution of an AES encryption based on the state output, a S-box of the set of S-boxes, and a third cryptographic key, and transmit the ciphertext; and a second electronic device, wherein the second electronic device is configured to:

receive, from the server, the set of AES parameters, receive, from the first electronic device, the ciphertext, obtain the decrypted text based on execution of an AES decryption procedure, wherein the AES decryption procedure is executed based on an inverse S-box of the set of inverse S-boxes and an inverse mix-column matrix of the set of inverse mix-column matrices, and transmit the decrypted text to the second user device, wherein the second user device receives the decrypted text based on the transmission, wherein the server is configured to generate the set of mix-column matrices, wherein each mix-column matrix of the set of mix-column matrices complies with a predefined criterion, wherein the predefined criterion is ensuring that each mix-column matrix of the set of mix-column matrices is invertible, wherein an interval between the generation of each pair of mix-column matrices of the set of mix-column matrices is less than a second predefined interval, and wherein at least two ciphertexts are generated within the second predefined interval.

14. The system according to claim 13, wherein the first electronic device further comprises a first processor, wherein the first processor is configured to perform a first set of operations by use of a first AES library, and wherein the first set of operations include reception of the set of AES parameters and the input plaintext, obtaining the first fusion function input, execution of the set of encryption rounds, obtaining the ciphertext, and transmission of the ciphertext to the second electronic device.

15. The system according to claim 14, wherein the second electronic device further comprises a second processor, wherein the second processor is configured to perform a second set of operations by use of a second AES library, and wherein the second set of operations include reception of the set of AES parameters and the ciphertext, obtaining the decrypted text, and transmission of the decrypted text to the second user device.

16. The system according to claim 13, wherein the first electronic device further comprises a first processor and a first AES module, wherein the first processor is configured to receive the set of AES parameters and the input plaintext, and transmit the set of AES parameters and the input plaintext to the first AES module, wherein the first AES module is configured to obtain the first fusion function input, execute the set of encryption rounds, obtain the ciphertext, and transmit the ciphertext to the first processor, and wherein the first processor is further configured to transmit the ciphertext to the second electronic device.

17. The system according to claim 16, wherein the second electronic device further comprises a second processor and a second AES module, wherein the second processor is configured to receive the set of AES parameters and the ciphertext, and transmit the set of AES parameters and the ciphertext to the second AES module, wherein the second AES module is configured to obtain the decrypted text and transmit the decrypted text to the second processor, and wherein the second processor is further configured to transmit the decrypted text to the second user device.

18. The system according to claim 17, wherein the second processor transmits the set of AES parameters and the ciphertext to the second AES module through DMA.

19. The system according to claim 16, wherein the first processor transmits the set of AES parameters and the input plaintext to the first AES module through Direct Memory Access (DMA).

* * * * *